(12) United States Patent
Kerr et al.

(10) Patent No.: US 12,010,463 B2
(45) Date of Patent: Jun. 11, 2024

(54) UNDERWATER CAMERA UNIT AND SURFACE CONTROLLER

(71) Applicant: JFD LIMITED, Westhill (GB)

(72) Inventors: Gareth Kerr, Aberdeen (GB); Maurice Coull, Aberdeen (GB)

(73) Assignee: JFD LIMITED

( * ) Notice: Subject to any disclaimer, the term of this patent is extended or adjusted under 35 U.S.C. 154(b) by 212 days.

(21) Appl. No.: 17/424,817

(22) PCT Filed: Jan. 23, 2020

(86) PCT No.: PCT/GB2020/050159
§ 371 (c)(1),
(2) Date: Jul. 21, 2021

(87) PCT Pub. No.: WO2020/152471
PCT Pub. Date: Jul. 30, 2020

(65) Prior Publication Data
US 2022/0094884 A1    Mar. 24, 2022

(30) Foreign Application Priority Data

Jan. 25, 2019 (GB) .................................... 1901059

(51) Int. Cl.
*H04N 7/18*    (2006.01)
*G03B 17/08*    (2021.01)
(Continued)

(52) U.S. Cl.
CPC ............ *H04N 7/185* (2013.01); *G03B 17/08* (2013.01); *H04N 23/51* (2023.01); *H04N 23/57* (2023.01)

(58) Field of Classification Search
CPC ........ H04N 7/185; H04N 23/51; H04N 23/57; G03B 17/08
(Continued)

(56) References Cited

U.S. PATENT DOCUMENTS 4,268,858 A    5/1981  Wood
4,745,478 A *  5/1988  Nakagawa ............. H03K 17/76
                                                     348/706
(Continued)

FOREIGN PATENT DOCUMENTS

CN    203758537 U    8/2014
EP      2863257 A1   4/2015
(Continued)

OTHER PUBLICATIONS

PCT/GB2020/050159, International Search Report and Written Opinion, dated Mar. 20, 2020, 14 pages.
(Continued)

*Primary Examiner* — Matthew David Kim
(74) *Attorney, Agent, or Firm* — Stoel Rives LLP

(57) ABSTRACT

An underwater camera unit and a surface controller for controlling the underwater camera unit via an underwater cable. The camera unit includes a pressure housing containing a modem, a command processor coupled to the modem to receive control signals from the modem, an image processor coupled to the modem, to provide image data to the modem, and a camera sensor coupled to the image processor. The camera unit also includes a connector for connecting the underwater camera unit to the underwater cable. The modem is coupled to the connector. The modem is operable to multiplex image data from the image processor with control and/or monitoring signals from the command processor and transmit the multiplexed image data and control and/or monitoring signals from the underwater camera unit via the connector. The modem is also operable to receive control and/or monitoring signals via the connector and pass them to the command processor.

22 Claims, 4 Drawing Sheets

(51) Int. Cl.
*H04N 23/51* (2023.01)
*H04N 23/57* (2023.01)

(58) Field of Classification Search
USPC .......................................................... 348/143
See application file for complete search history.

(56) References Cited

U.S. PATENT DOCUMENTS

| | | | | | |
|---|---|---|---|---|---|
| 5,414,463 | A | * | 5/1995 | Katoh | H04N 7/0122 |
| | | | | | 348/E5.111 |
| 5,441,434 | A | * | 8/1995 | Caulkins | B65G 54/02 |
| | | | | | 362/802 |
| 5,875,000 | A | * | 2/1999 | Yamaguchi | H04N 5/445 |
| | | | | | 348/568 |
| 6,072,540 | A | * | 6/2000 | Park | H04N 5/57 |
| | | | | | 348/688 |
| 6,392,698 | B1 | | 5/2002 | Yokoyama | |
| 7,298,389 | B2 | * | 11/2007 | Hayashi | G11B 7/0037 |
| | | | | | 347/225 |
| 2002/0015099 | A1 | * | 2/2002 | Igarashi | H04N 23/60 |
| | | | | | 348/E5.04 |
| 2003/0174206 | A1 | * | 9/2003 | Moroz | H04N 7/185 |
| | | | | | 348/81 |
| 2005/0201066 | A1 | * | 9/2005 | Masui | G01T 1/02 |
| | | | | | 361/727 |
| 2008/0090518 | A1 | * | 4/2008 | Yoshida | H04B 13/02 |
| | | | | | 455/40 |
| 2008/0284862 | A1 | * | 11/2008 | Kogane | H04N 23/66 |
| | | | | | 348/E5.042 |
| 2010/0020527 | A1 | * | 1/2010 | Fiermuga | H05K 1/181 |
| | | | | | 362/20 |
| 2014/0008968 | A1 | * | 1/2014 | Moeny | E21B 7/15 |
| | | | | | 307/106 |
| 2014/0079421 | A1 | * | 3/2014 | Takeuchi | G03G 13/16 |
| | | | | | 399/314 |
| 2014/0226270 | A1 | * | 8/2014 | Holopainen | G06F 1/163 |
| | | | | | 361/679.03 |
| 2017/0064162 | A1 | * | 3/2017 | Haraguchi | A61B 1/051 |
| 2018/0180733 | A1 | * | 6/2018 | Smits | G06T 7/70 |

FOREIGN PATENT DOCUMENTS

| | | |
|---|---|---|
| JP | 200513664 A | 5/2005 |
| WO | 2007148318 A1 | 12/2007 |

OTHER PUBLICATIONS

Bradbeer, Robin, et al. "An Underwater Camera for Security and Recreational Use", Proceedings of the Ninth International Symposium on Macau, Poscataway, New Jersey, pp. 364-368, Jun. 14-16, 2005.

Fiber Optics Blog, "What components you need in a fiber optic CCTV transmission system". Jun. 21, 2020. See section on 'Control data and audio connections'. https://voscom.wordpress.com/tag/fiber-optic-converter/.

* cited by examiner

UNDERWATER CAMERA UNIT AND SURFACE CONTROLLER

RELATED APPLICATIONS

This application is a national phase application of International Patent Application No. PCT/GB2020/050159, filed Jan. 23, 2020, which claims the benefit of Great Britain Application No. 1901059.4 filed Jan. 25, 2019, both of which are hereby incorporated by reference herein in their entirety.

BACKGROUND

The present specification relates to an underwater camera unit, to a surface controller for controlling an underwater camera unit via an underwater cable, to a system comprising such an underwater camera unit and surface controller, to a method of operating an underwater camera unit, and to a method of operating a surface controller for controlling an underwater camera unit via an underwater cable.

Underwater video cameras have been in use for many years and are used in a variety of applications such as diving and underwater monitoring using manned or remotely operated submersibles where cameras are permanently connected to equipment at the surface for monitoring and recording. Historically the type of video cameras used in this application were based on composite video, blanking and sync (CVBS) signalling methods and were typically capable of capturing images with resolutions of up to 600 vertical TV lines and a 4:3 aspect ratio. This type of camera and signalling is generally referred to as 'standard definition'.

Subsequent development of video cameras has produced designs with greater resolutions that rely on digital methods to transmit their signals. Such cameras can provide image resolutions of 1920×1080 pixels and greater—and are therefore referred to as 'high definition' or HD.

The method used for providing power to both standard and high definition underwater cameras has been through the use of a separate power cable or conductors from the surface. Video signals from cameras have been transmitted by a variety of methods including analogue CVBS video signals via coaxial or twisted-pair cables (for standard definition systems) and via coaxial or 4-wire Ethernet cables for high definition systems. Cameras or camera systems can also incorporate a means of converting the video signals to fibre-optic transmission that then use optical fibre cables to send their data. Such fibre-optic systems require complex techniques to manage the optical signals and to re-convert them to electrical signals at the surface.

Analogue CVBS video signal transmission is subject to degradation and performance reduction as cable length increases. Digital high definition transmission methods using either coaxial cables or 4-wire Ethernet methods are not generally subject to degradation but can be subject to cable length limitations of typically 100 m. Signal cables carrying the video information for existing designs typically use separate conductors to the power supply cables used to power the camera and associated light.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided an underwater camera unit comprising:
a pressure housing containing:
a modem;
a command processor coupled to the modem to receive control and/or monitoring signals from the modem;
an image processor coupled to the modem to provide image data to the modem; and
a camera sensor coupled to the image processor; and
a connector for connecting the underwater camera unit to an underwater cable,
wherein the modem is coupled to the connector, and
wherein the modem is operable to:
multiplex image data from the image processor with control and/or monitoring signals from the command processor and transmit the multiplexed image data and control and/or monitoring signals from the underwater camera unit via the connector; and
receive control and/or monitoring signals via the connector and pass them to the command processor.

By multiplexing the image data with the control and/or monitoring signals, image data may be transmitted from the underwater camera unit and control and/or monitoring signals may be transmitted and received by the underwater camera unit using a single underwater cable. This may reduce the complexity and cost of the connection between the underwater camera unit and a surface controller.

The pressure housing may also contain a power supply circuit coupled to the connector for receiving a DC supply voltage from the underwater cable via the connector. The DC supply voltage may thus also be supplied to the underwater camera unit using the same underwater cable that is used to send/receive the multiplexed image data and control and/or monitoring signals.

The pressure housing may also contain a first light source, wherein the control and/or monitoring signals are for controlling and/or monitoring the operation of the light source. Accordingly, the first light source may be operated remotely, for instance by the surface unit that is coupled to the underwater camera unit using the aforementioned underwater cable.

The pressure housing may contain a further light source for use when there is a malfunction in the operation of the first light source. This may, for instance, provide a diver operating the underwater camera unit with an emergency light source to use, on failure of the first light source. The further light source may be self contained—for instance it may be provided with a local battery.

It is envisaged that the first light source may malfunction due to a lack of power. The underwater camera unit may comprise a driver circuit for driving the further light source, wherein the driver circuit is operable to switch on the further light source in response to a loss of the DC supply voltage to the power supply circuit.

The underwater camera unit may further comprise a magnet attachable to the underwater camera unit, wherein the driver circuit for driving the further light source is operable to detect the presence of magnetic flux associated with the magnet and to not switch on the further light source when the magnetic flux is detected, irrespective of whether the DC supply voltage to the power supply circuit is present. The magnet may be used to prevent the further light source from being switched on unnecessarily, in conditions in which it is intended that the DC supply voltage will not be present (e.g. when the underwater camera unit is not in use and is being stored).

The underwater camera unit may further include at least one sensor, and wherein the control and/or monitoring signals are for controlling and/or monitoring the operation of the at least one sensor.

The at least one sensor may be an environmental sensor. In one embodiment, the sensor is a pressure sensor for determining a depth of the underwater camera unit beneath the surface of water in which the underwater camera unit is submerged. This can allow depth information to be used to provide monitoring of the local depth of the underwater camera unit for operational uses such as managing diver depth exposures or operational positioning. Again, because this information is multiplexed with the image data, no separate cable is required to connect to a depth sensor.

The underwater camera unit may comprise a further connector, for connecting the underwater camera unit to a further device located externally with respect to the pressure housing, wherein the modem is coupled to the further connector, and wherein the control and/or monitoring signals are for controlling and/or monitoring the operation of the further device. The further device may for instance comprise a pressure sensor for determining a remaining air supply in a diver's air tank.

The modem may be an orthogonal frequency-division multiplexing (OFDM) modem. OFDM multiplexed data may tolerate the presence of a DC supply voltage on the underwater cable without substantial distortion.

An underwater cable may be connected to the connector of the underwater camera unit. The underwater cable may comprise two wires. In some embodiments, the underwater cable may comprise exactly two wires.

According to another aspect of the present disclosure, there is provided a surface controller for controlling an underwater camera unit via an underwater cable, the surface controller comprising:
  a connector for connecting the surface controller to the underwater cable to couple the surface controller to the underwater camera unit;
  a modem coupled to the connector;
  a processor operable to generate and process control and/or monitoring signals, wherein the processor is coupled to the modem; and
  an interface for passing image data to image display/recording equipment, wherein the interface is coupled to the modem;
wherein the modem is operable to:
  receive image data multiplexed with control and/or monitoring signals via the connector,
  de-multiplex the image data and the control and/or monitoring signals;
  pass the de-multiplexed image data to the interface;
  pass the de-multiplexed control and/or monitoring signals to the processor; and
  receive the control and/or monitoring signals generated by the processor and pass them to the connector for transmission to the underwater camera unit via the underwater cable.

By multiplexing the image data with the control and/or monitoring signals, image data may be received from an underwater camera unit and control and/or monitoring signals may be transmitted and received by the surface unit using a single underwater cable. This may reduce the complexity and cost of the connection between the surface controller and one or more underwater camera units.

The surface controller may comprise a power supply circuit couple to the connector, for supplying a DC supply voltage to the underwater cable via the connector. The DC supply voltage may thus also be supplied by the surface unit using the same underwater cable that is used to send/receive the multiplexed image data and control and/or monitoring signals.

The control and/or monitoring signals generated by the processor may be for controlling and/or monitoring the operation of a light source in the underwater camera unit. Accordingly, the first light source may be operated remotely by the surface unit.

The surface controller may comprise a user interface including a display and one or more user input devices.

The modem may be an orthogonal frequency-division multiplexing (OFDM) modem. OFDM multiplexed data may tolerate the presence of a DC supply voltage on the underwater cable without substantial distortion.

An underwater cable may be connected to the connector of the surface controller. The underwater cable may comprise two wires. In some embodiments, the underwater cable may comprise exactly two wires.

According to a further aspect of the present disclosure, there is provided a system comprising an underwater camera unit according to any of claims 1 to 13 and a surface controller according to any of claims 14 to 20.

The underwater camera unit may be coupled to the surface controller via the underwater cable.

The system may comprise at least one further said underwater camera unit coupled to the surface controller via the underwater cable. The multiplexed approach to sending and receiving the image data and control and/or monitoring signals lends itself to the connection of multiple underwater camera units to a single surface unit, because the data and signals for each underwater camera unit may be multiplexed together.

According to another aspect of the present disclosure, there is provided a method of operating an underwater camera unit, the underwater camera unit comprising:
  a pressure housing containing:
    a modem;
    a command processor coupled to the modem to receive control signals from the modem;
    an image processor coupled to the modem to provide image data to the modem; and
    a camera sensor coupled to the image processor; and
  a connector for connecting the underwater camera unit to an underwater cable,
wherein the modem is coupled to the connector,
wherein the method comprises the modem:
  multiplexing image data from the image processor with control and/or monitoring signals from the command processor and transmitting the multiplexed image data and control and/or monitoring signals from the underwater camera unit via the connector; and
  receiving control and/or monitoring signals via the connector and passing them to the command processor.

By multiplexing the image data with the control and/or monitoring signals, image data may be transmitted from the underwater camera unit and control and/or monitoring signals may be transmitted and received by the underwater camera unit using a single underwater cable.

According to a further aspect of the present disclosure, there is provided a method of operating a surface controller for controlling an underwater camera unit via an underwater cable, the surface controller comprising:
  a connector for connecting the surface controller to the underwater cable to couple the surface controller to the underwater camera unit;
  a modem coupled to the connector;

a processor operable to generate and process control and/or monitoring signals, wherein the processor is coupled to the modem; and an interface for passing image data to image display/recording equipment, wherein the interface is coupled to the modem;

the method comprising the modem:

receiving image data multiplexed with control and/or monitoring signals via the connector;

de-multiplexing the image data and the control and/or monitoring signals;

passing the de-multiplexed image data to the interface;

passing the de-multiplexed control and/or monitoring signals to the processor; and receiving control and/or monitoring signals generated by the processor and passing them to the modem for transmission to the underwater camera unit via the underwater cable.

By multiplexing the image data with the control and/or monitoring signals, image data may be received from an underwater camera unit and control and/or monitoring signals may be transmitted and received by the surface unit using a single underwater cable.

BRIEF DESCRIPTION OF THE DRAWINGS

Embodiments of this disclosure will be described hereinafter, by way of example only, with reference to the accompanying drawings in which like reference signs relate to like elements and in which.

DETAILED DESCRIPTION

Embodiments of this disclosure are described in the following with reference to the accompanying drawings.

Embodiments of this disclosure can provide underwater camera unit, which can be connected to and controlled remotely by a surface controller via an under water cable. The camera unit may, for instance be used by a diver, or may be mounted on a submersible.

Embodiments of this disclosure can implement the connection between the underwater camera unit and the surface controller using a single cable, which may for instance comprise two wires (e.g. a twisted pair). This may be achieved by multiplexing image data with control and/or monitoring signals sent back and forth between the underwater camera unit and the surface controller (as well as, in some embodiments, a supply voltage provided by the surface controller to power the underwater camera unit). This can simplify the connection between the underwater camera unit and the surface controller since the need to provide separate cables for (i) conveying image data from the underwater camera unit to the surface controller, (ii) conveying control and/or monitoring signals between the surface controller and the underwater camera unit (e.g. for controlling/monitoring a light or other devices incorporated into, or connected to, the underwater camera unit), as well as (iii) providing a supply voltage to the underwater camera unit, may be obviated.

Figure 1:
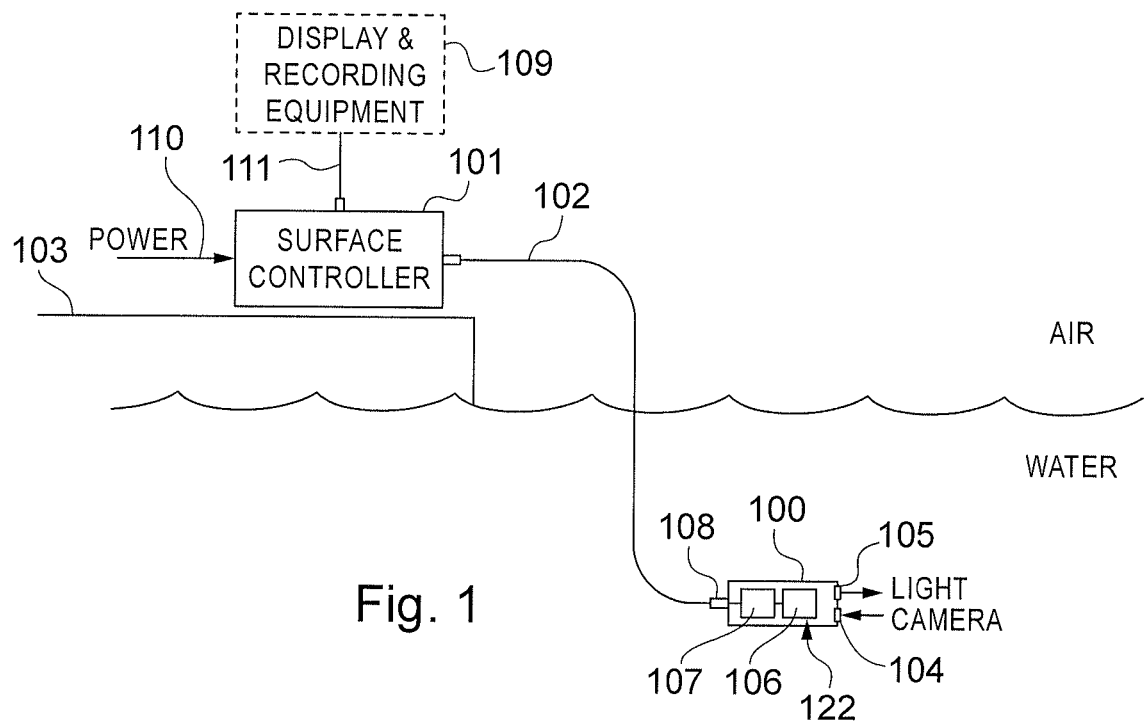
FIG. 1 shows a system for multiplexing signals from an underwater video camera according to an embodiment of this disclosure.

FIG. 1 shows a system according to an embodiment of this disclosure. The system includes an underwater camera unit 100 and a surface controller 101. The underwater camera unit 100 and the surface controller 101 are connected together by an underwater cable 102, which as mentioned above may comprise two wires, e.g. a twisted pair.

The underwater camera unit 100 may comprise a camera 106 (e.g. a high definition (HD) video camera operable to provide image resolutions of 1920×1080 pixels and greater (e.g. 3840×2160 or 4096×2160, or so-called "4K resolutions")) including a camera sensor, an image processor and one of more optical elements forming a lens in front of the camera sensor.

The underwater camera unit 100 may also comprise circuitry 107 for implementing a number of sub-systems to provide a various functions including conditioning an electrical power supply transmitted via underwater cable 102, encoding video camera signals from the camera 106, multiplexing the camera signals together with control and control and/or monitoring signals as will as with the power supply.

The underwater camera unit 100 may further comprise a connector 108 for connecting the underwater camera unit 100 to the underwater cable 102.

The underwater camera unit 100 may further comprise a pressure housing 122 for containing the features of the underwater camera unit 100 such as the camera 106 and the circuitry 107. The pressure housing 122 may be formed from a metal such as an anodized aluminum alloy, stainless steel or titanium alloy. The pressure housing 122 may be provided with a number of optically transparent windows 104, 105. The windows 104, 105 may be sealed into openings in the pressure housing 122 using O-rings. The windows 104, 105 may be formed from, for example, borosilicate glass or sapphire glass depending on the operational depth rating of the underwater camera unit 100. An inside face of window 104 may be treated with an optical coating to suppress internal light reflections. In the present embodiment, the window(s) are provided in a front surface of the pressure housing 122. These windows may allow the camera 106 to capture images (e.g. HD video (e.g. with image resolutions of 1920×1080 pixels and greater (e.g. 3840×2160 or 4096×2160, or so-called "4K resolutions")) of objects located externally with respect to the pressure housing 122 (see window 104). In some embodiments, the underwater camera unit 100 may include a light source (e.g. an light emitting diode (LED)) located inside the pressure housing 122, for illuminating objects to be captured by the camera 106 and/or for providing a diver with a source of illumination. A window 105 may accordingly be provided to allow light from such a light source to be conveyed to the exterior of the pressure housing 122.

The surface controller 101 may be located on a suitable host platform 103 such as a boat, vessel, installation or suitable area on adjacent dry-land. The surface controller 101 may be housed within a suitable electronic enclosure and may receive electrical power from the host platform 103 via power supply cable 110.

As will be described in more detailed below, the surface controller 101 may be connected to external display and recording equipment 109, e.g. via an external Ethernet network 111. The display and recording equipment 109 may typically comprise display decoders, video data stream recording devices, display computers etc. and such proprietary equipment that is capable of receiving and processing industry standard high-definition IP video streams is widely used.

Figure 2:
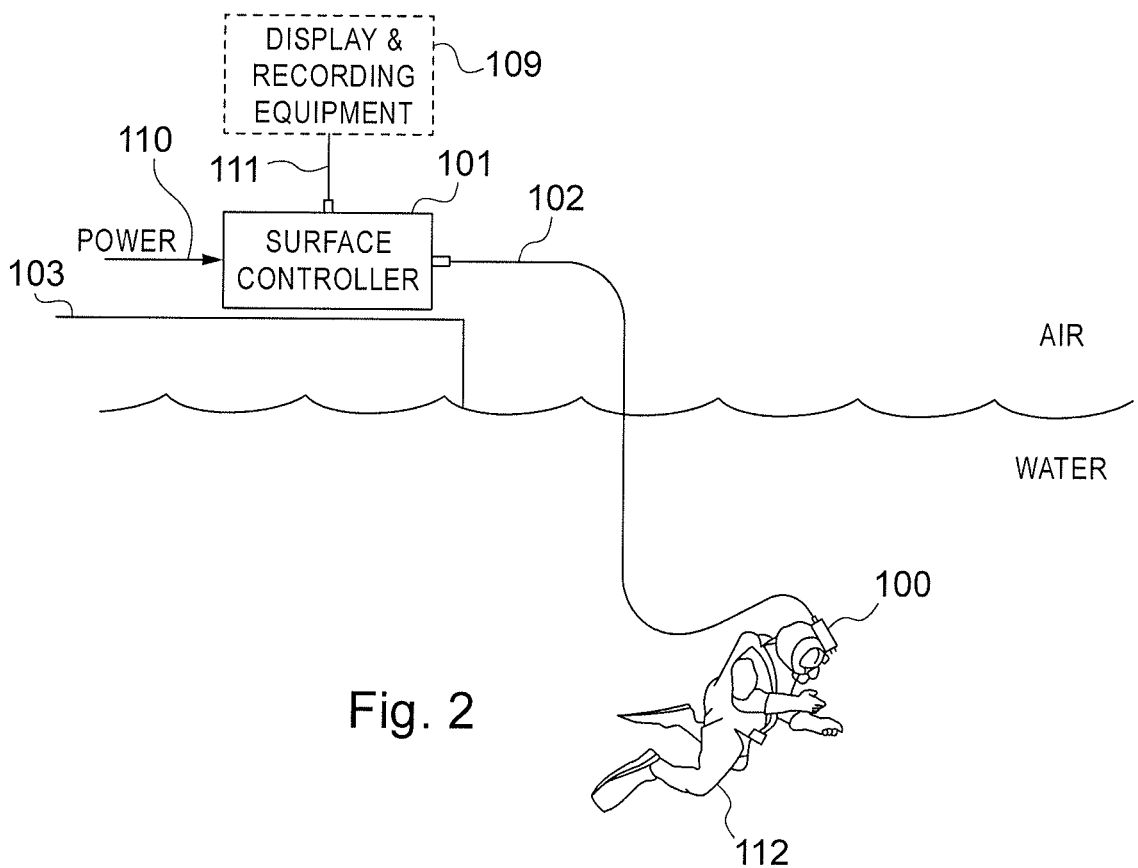
FIG. 2 shows a system for multiplexing signals from an underwater video camera according to another embodiment of this disclosure.

FIG. 2 shows a system according to another embodiment of this disclosure. In this embodiment, the system of FIG. 1 is used by a diver 112. The underwater camera unit 100 may, for instance be carried in diver's hand, or may be affixed to the diver 112. For instance, in the embodiment of FIG. 2, the underwater camera unit 100 is attached to the diver's helmet.

Figure 3:
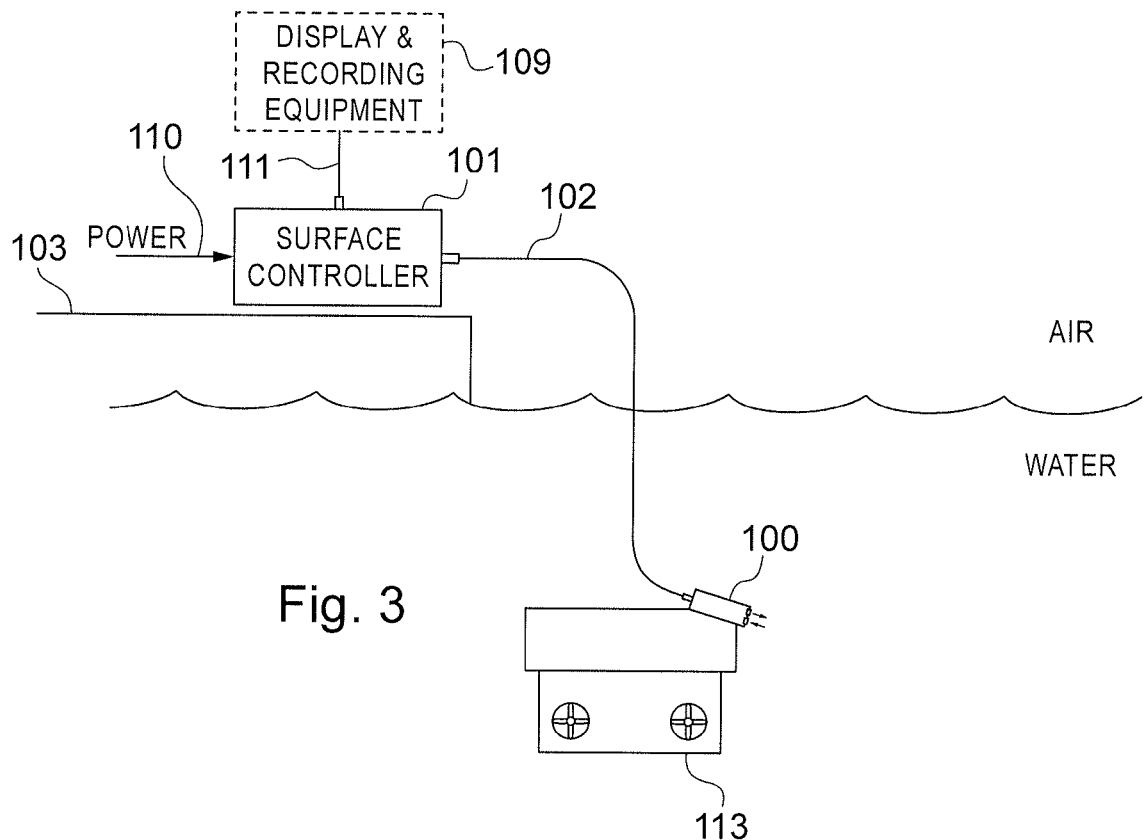
FIG. 3 shows a system for multiplexing signals from an underwater video camera according to a further embodiment of this disclosure.

FIG. 3 shows a system according to a further embodiment of this disclosure. In this embodiment, the system of FIG. 1 is used with a submersible 113. The underwater camera unit 100 may, for instance may be mounted on the submersible 113. The submersible 113 may be manned and controlled locally, or may be or unmanned and controlled remotely from the surface.

Figure 4:
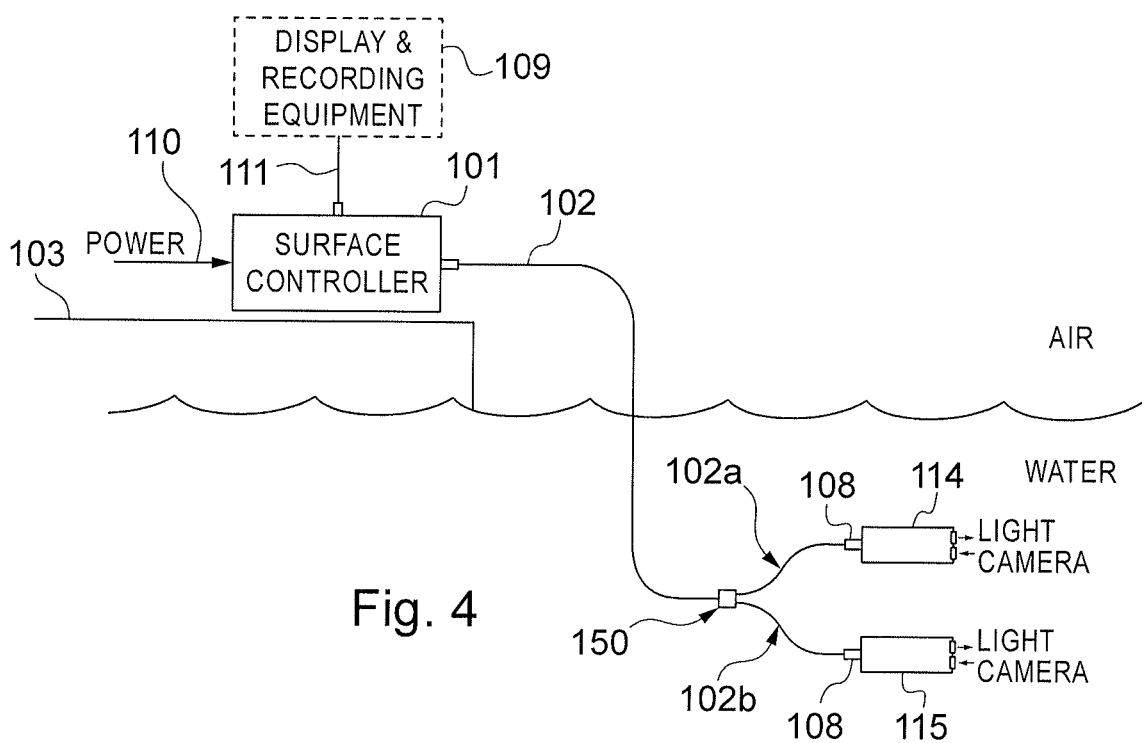
FIG. 4 shows a system for multiplexing signals from an underwater video camera according to another embodiment of this disclosure.

FIG. 4 shows a system according to another embodiment of this disclosure. In this embodiment, a plurality of underwater camera units 114, 115 of the kind described herein are connected to the surface controller 101 by the underwater cable 102. Although only two underwater camera units 114, 115 are shown in FIG. 4, it is envisaged that more than two such underwater camera units may be connected to the surface controller 101 by the underwater cable 102. The number of underwater camera units used may be limited by the available bandwidth provided by the multiplexing scheme as described herein. For instance, OFDM multiplexing may typically allow up to ten underwater camera units to be connected to the surface controller 101 using the same underwater cable 102.

As shown in FIG. 4, the underwater cable 102 may include a number of branches 102a, 102b, each branch for connecting to a respective underwater camera unit. The branches 102a, 102b may be joined at a hub 150. At the hub 150, the wires contained in each branch 102a, 102b may be interconnected with the wires in the section of the underwater cable 102 located between the hub 150 and the surface controller 101. For instance, where each branch includes two wires (e.g. a twisted pair) and the section of the underwater cable 102 located between the hub 150 and the surface controller 101 similarly includes two wires, a first wire from each branch may be interconnected at the hub 150 to a first wire in the section of the underwater cable 102 located between the hub 150 and the surface controller 101, and a second wire in each branch may be interconnected at the hub 150 to a second wire in the section of the underwater cable 102 located between the hub 150 and the surface controller 101. The multiplexing scheme described herein may thus be used to (i) convey image data from each underwater camera unit 114, 115, to the surface controller 101 (ii) convey control and/or monitoring signals between the surface controller 101 and each underwater camera unit 114, 115, as well as to (iii) provide a supply voltage to each underwater camera unit 114, 115.

Figure 5:
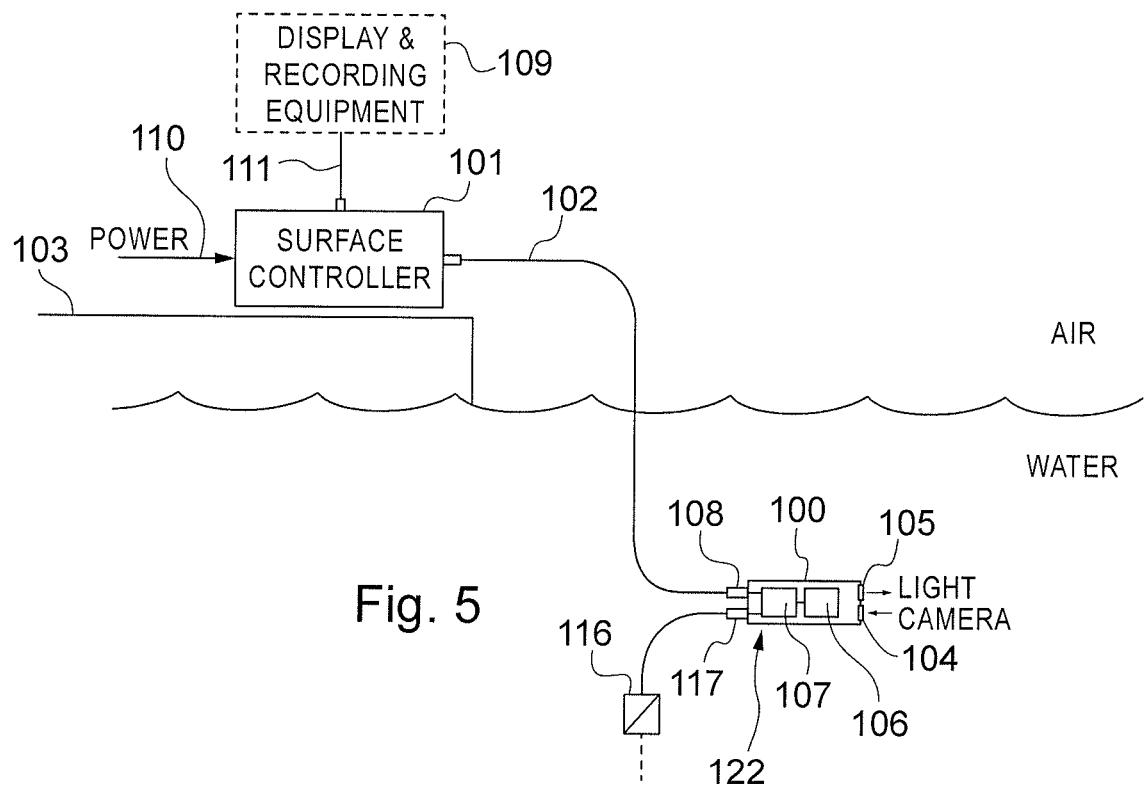
FIG. 5 shows a system for multiplexing signals from an underwater video camera according to a further embodiment of this disclosure.

FIG. 5 shows a system according to a further embodiment of this disclosure. In this embodiment, the underwater camera unit 100 has a further connector 117, for connecting the underwater camera unit 100 to a further device 116 located externally with respect to the pressure housing 122. As will be described in more detail below, the further connector 117 may be connected to the circuitry 107 to provide various functions associated with the further device 116 located externally with respect to the pressure housing 122. The further device(s) 116 may, for instance, be sensors, such as pressure, temperature, or light sensors. The further connector 117 may be used to send receive control and/or monitoring signals between the surface controller 101 and the further device(s) 116 (e.g. sensors), via the underwater camera unit 100.

In one embodiment, the further device 116 may be a pressure sensor for determining a remaining air supply in a diver's air tank. The output of the pressure sensor may be monitored by the surface controller 101 by the underwater camera unit 100 multiplexing an output signal of the pressure sensor with the other control and/or monitoring signals, the image data and the voltage supply conveyed by the underwater cable 102. In this way, the diver's air supply may be monitored at the surface.

Figure 6:
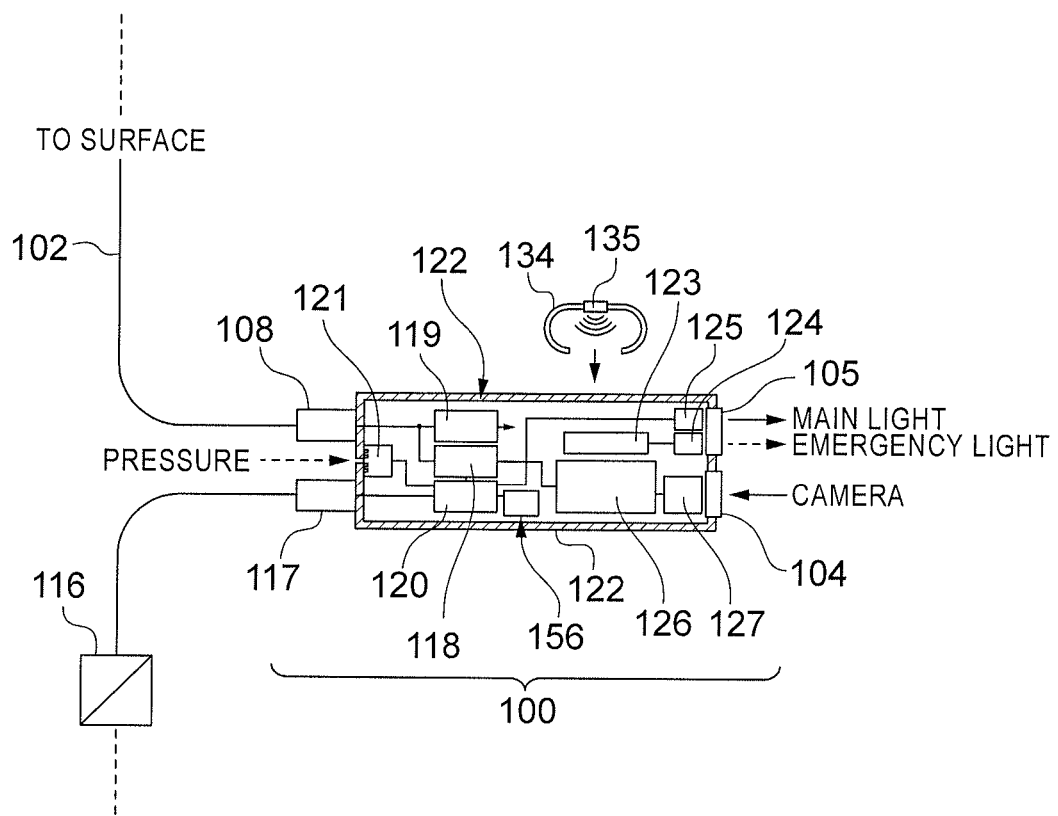
FIG. 6 shows the sub-systems of the underwater camera unit according to another embodiment of this disclosure.

FIG. 6 shows an underwater camera unit 100 according to an embodiment of this disclosure in more detail.

As described above, the underwater camera unit 100 includes a pressure housing 122. The pressure housing 122 contains a modem 118, a command processor 120, an image processor 126, and a camera sensor 127.

The command processor 120 is coupled to the modem to receive control and/or monitoring signals from the modem 118. The command processor 120 may similarly send control and/or monitoring signals to the modem 118. Accordingly, the command processor 120 may manage and control camera functions of the underwater camera unit 100 under remote control from the surface controller 101. The command processor 120 may also control the light source 125 (to be described below), e.g. such as adjusting the light intensity. The command processor 120 may also switch power supplies to sub-systems, and monitor internal voltages and diagnostic signals. The command processor 120 may communicate with a partner processor included in the surface controller 101 (to be described below) via the underwater cable 102. The command processor 120 may further interface to any sensor(s) that are either incorporated inside underwater camera unit 100 or connected externally.

The operation of an example of the camera will now be described.

The camera sensor 127 is coupled to the image processor 126 to pass image data to the image processor 126. The image processor 126 is coupled to the modem 118 to provide processed image data (e.g. HD video data) to the modem 118. Again, the camera of the underwater camera unit may be operable to provide image resolutions of 1920×1080 pixels and greater (3840×2160 or 4096×2160, or so-called "4K resolutions"). Accordingly, image data (e.g. HD video data) provided to the modem 118 by the image processor 126 may be consistent with one of these formats.

Light may pass through window 104 to the camera optics and camera sensor 127, where the optical image may be converted to a high-definition electrical image using, for example, a rectangular charge-coupled device (CCD) sensor array. The output of the camera sensor 127 may then be passed to the image processor 126, that may convert the raw CCD array image into standard IP camera video streams such as 'Motion JPEG' or 'h.264' with adjustable resolutions and frame rates using advanced video compression techniques such as MPEG-4 Part 10 or Motion JPEG. The output from image processor 126 may, for instance, be a 10/100 Mbit 4-wire bi-directional Ethernet signal link which connects to the modem 118. Within the image processor 126 there may be the facility to record video image data locally to non-volatile flash memory storage for subsequent viewing and analysis, while also transmitting the image data to the surface controller 101 in parallel.

As described above, the underwater camera unit 100 also includes a connector 108 for connecting the underwater camera unit 100 to the underwater cable 102. The connector 108 may be any suitable connector for withstanding the pressure at depths at which the underwater camera unit is to be used, to prevent the ingress of water into the pressure housing 122. The connector may, for instance, include a pair of terminals, for connecting to a corresponding pair (e.g. twisted pair) of wires located in the underwater cable 102. The underwater cable itself may comprise a waterproof casing, for protecting the wires.

The modem 118 is connected to the connector 108, allowing the modem 118 to send signals to, and receive signals from, the surface controller 101 via the underwater cable.

As mentioned previously, the underwater camera unit 100 may also be provided with power in the form of a supply voltage from the surface controller 101 via the underwater cable 102. The underwater camera unit 100 may thus include power supply circuit 119, which is connected to the connector 108, to receive this supply voltage. The supply voltage may for instance be delivered as a regulated direct current (DC) supply. The supply voltage may, for example, be nominally 28 Volts. The power supply circuit 119 may convert the incoming DC power to a number of internal voltage levels suitable for operation of the camera's sub-systems, and these internal voltages may then be distributed to those sub-systems. The power supply circuit 119 may be tolerant of the multiplexed and superimposed control and/or monitoring signals described herein. Similarly, the multiplexed (e.g. by OFDM) control and/or monitoring signals may be tolerant of and substantially unaffected by the DC power supply voltage.

In this embodiment, the underwater camera unit 100 includes a light source 125. The light source may, for instance, be a light emitting diode (LED). The light source may receive power from the power supply circuit 119. As mentioned previously, the light source 125 may be mounted behind a window 105 in the pressure housing 122. The light source 125 is connected to the command processor 120, to allow the command processor to control of the light source 125. The operation of the light source 125 may accordingly be controlled and/or monitored using control and/or monitoring signals passed between the surface controller 101 and the underwater camera unit 100 via the underwater cable 102. As described herein, these control and/or monitoring signals may be multiplexed, to allow them to communicated via the underwater cable, along with the image data provided by the image processor 126.

In this embodiment, the underwater camera unit 100 also includes a second light source 124. The second light source 124 may also be mounted behind the window 105 in the pressure housing 122 (although it is envisaged that the second light source may alternatively be provided with its own window). The second light source 124 may be used in an emergency situation. For instance, the second light source 124 may be used when it is determined that the first light source 125 is not functioning.

The further light source 124 may be self-contained in the sense that its operation does not require receipt of the supply voltage from the surface controller 101. Accordingly, the further light source may be provided with, and connected to, a power source such as a battery 123 located inside the pressure housing 122.

The further light source 124 may be switched on in situations in which the light source 125 has malfunctioned due to the absence of the supply voltage from the surface controller 101. The underwater camera unit 100 may be configured to detect the absence of this supply voltage and switch on the further light source 124 accordingly. For instance, the underwater camera unit 100 may comprise a driver circuit for driving the further light source 124. This driver circuit may be operable automatically to switch on the further light source 124 in response to detecting a loss of the DC supply voltage to the power supply circuit 119.

In this embodiment, the underwater camera unit 100 further comprises a magnet 135 (e.g. a permanent magnet) which is attachable to the underwater camera unit 100 using an attachment such as a clip 134. For instance, the magnet 135 may be attached to the exterior of the pressure housing 122. The driver circuit for driving the further light source 124 may be operable to detect the presence of magnetic flux associated with the magnet 135 when the magnet 135 is attached to the underwater camera unit 100. When the magnetic flux is present, the driver circuit may be operable to not switch on the further light source 124, irrespective of whether the DC supply voltage to the power supply circuit 119 is present. The magnet 135 may thus be used to prevent the further light source 124 from being switched on unnecessarily, in conditions in which it is intended that the DC supply voltage will not be present (e.g. when the underwater camera unit 100 is not in use and is being stored).

The underwater camera unit 100 may include a number of sensors. These sensors may include, for instance, environmental sensors such as one or more pressure, temperature, or light sensors. The sensors may also include attitude/heading reference sensor (AHRS) 156 to provide data regarding a direction and orientation of the underwater camera unit 100.

Openings and/or windows may be provided in the pressure housing 122 to allow the sensor(s) access to the exterior of the pressure housing 122 for performing their sensing functions. The sensors may be connected to the command processor 120, to allow the command processor to control and monitor them according to the aforementioned control and/or monitoring signals received from the surface controller 101. Accordingly, the sensors may be operated from the surface. The output of each sensor may be multiplexed with the image data, any other control and/or monitoring signals and the supply voltage on the underwater cable 102 as described herein.

In the present embodiment, the at least one environmental sensor is a pressure sensor 121 for determining a depth of the underwater camera unit 100. The pressure sensor 121 may be provided with an aperture in the pressure housing 122 to communicate ambient water pressure to a pressure sensing element within the pressure sensor 121. This aperture may also be used to connect calibration equipment during maintenance. The pressure sensor 121 can allow depth information to be used to provide monitoring of the local depth of the underwater camera unit 100 for operational uses such as managing diver depth exposures or operational positioning. Because this information is multiplexed with the image data, no separate cable is required to connect to a depth sensor.

As can be seen in FIG. 6, this embodiment includes an attitude/heading reference sensor (AHRS) 156 of the kind mentioned above. This sensor 156 can provide data regarding a direction and orientation of the underwater camera unit 100, which in turn may provide an indication regarding the direction and orientation of a diver 112 wearing the underwater camera unit 100 or a submersible 113 upon which the underwater camera unit 100 is mounted. Again, because the data from the sensor 156 is multiplexed with the image data, no separate cable is required to connect to sensor 156.

The operation of the modem 118 will now be described.

In general terms, the modem 118 is operable to multiplex image data received from the image processor 126 with control and/or monitoring signals from the command processor 120 and transmit the multiplexed image data and control and/or monitoring signals from the underwater camera unit 100 via the connector 108. Note that the control and/or monitoring signals may relate to the operation of, for instance, the camera, the light source 125, the command processor 120, any sensors (such as the pressure sensor 121 or attitude/heading reference sensor (AHRS) 156) and/or any further devices 116 connected to the underwater camera unit (e.g. via a connector such as the connector 117). These signals may thus be received at the surface controller 101.

The modem 118 is also operable receive control and/or monitoring signals from the surface controller 101, allowing features of the underwater camera unit 100 to be controlled and/or monitored remotely by the surface controller 101 via the underwater cable 102. Again, these control and/or monitoring signals may relate to the operation of, for instance, the camera, the light source 125, the command processor 120, any sensors (such as the pressure sensor 121 or the attitude/heading reference sensor (AHRS) 156) and/or any further devices 116 connected to the underwater camera unit (e.g. via a connector such as the connector 117).

The modem 118 may be an orthogonal frequency division multiplexing (OFDM) modem, operable to encode the image data signals from the image processor 126 and the control and/or monitoring signals using wavelet orthogonal frequency division multiplexing (OFDM) techniques. In one embodiment, the modem 118 may use OFDM encoding techniques to convert incoming physical layer (PHY) Ethernet packet data to a number of sub-carriers (e.g. up to 432 sub-carriers) each with an analogue bandwidth range (e.g. of up to 28 MHz). This technique may implement sharp sideband rejection through the use of orthogonal signals in both frequency and time domains. Additionally, in one embodiment, a error correction may be used that relies upon the low-density parity-check (LDPC) encoding together with forward error checking (FEC) to provide low error rates and high coding gain over the underwater cable 102 (which, as described herein may comprise two wires). In one embodiment, the signals may be encrypted. This may be implemented using an AES-128 link-layer (Layer 2) to provide application layer encryption.

In one embodiment, the output of the (e.g. OFDM) modem 118 may be a hybrid balun connection to the underwater cable 102 (which again, may comprise two wires) via the connector 108. The (e.g. OFDM) modem 118 may support full-duplex communications in both directions simultaneously allowing encoded high-definition camera data to be transmitted to the surface via the underwater cable 102 at the same time as receiving and transmitting control and/or monitoring signals via the same multiplexed link.

Figure 7:
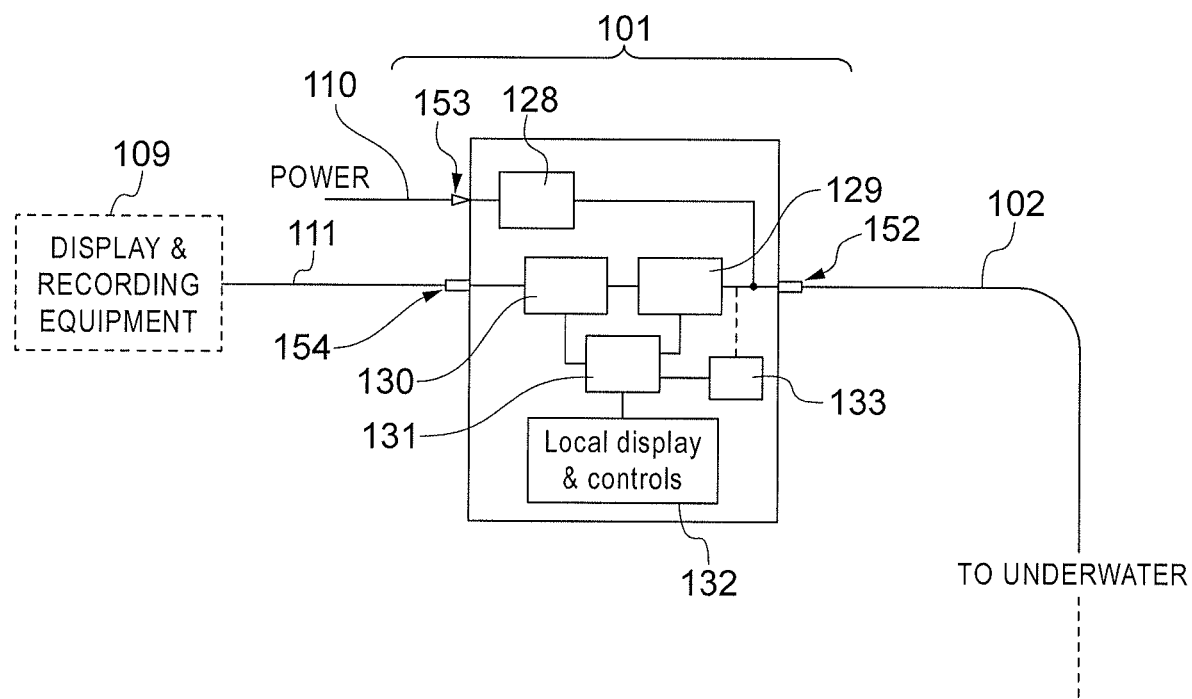
FIG. 7 shows the sub-systems of the surface control unit according to a further embodiment of this disclosure.

FIG. 7 shows a surface unit 101 according to an embodiment of this disclosure in more detail.

The surface controller 101 may be used for remotely controlling the underwater camera unit 100 via the underwater cable 100. As noted previously, the surface controller 101 may be provided on a suitable host platform 103 such as a boat, vessel, installation or suitable area on adjacent dry-land. In general terms, the surface controller 101 includes a connector 152 for connecting the surface controller 101 to the underwater cable 102 to couple the surface controller 101 to the underwater camera unit 100. The connector 152 may form a permanent connection, or alternatively may permit disconnection of the surface controller 101 from the underwater cable 102 (e.g. when not in use). The connector may comprise a hybrid balun connection. The surface controller 101 also includes a modem 129. The modem 129 is coupled to the connector 152.

The surface controller 101 further includes a processor 131. The processor 131 is operable to generate and process control and/or monitoring signals for controlling and monitoring the sub-systems of the underwater camera unit 100 (e.g. the camera 106, the light source 125, any sensors (e.g. the pressure sensor 121 or the attitude/heading reference sensor (AHRS) 156) and also any further devices 116 attached to the underwater camera unit 100 via the connector 117). The processor 131 is coupled to the modem 129, to allow control and/or monitoring signals produced by the processor 131 to be sent to the underwater camera unit 100 via the underwater cable 102. The processor 131 is also operable to receive and process control and/or monitoring signals received from the underwater camera unit via the underwater cable 102 and the modem 129. The processor 131 may further be operable to manage and control the sub-system functions of the surface controller 101.

The surface controller 101 also includes an interface 130. The interface 130 is coupled to the modem 129. Accordingly, the interface 130 can receive the image data sent to the surface controller 101 by the underwater camera unit 100 via the underwater cable 102. The interface 130 is operable to pass the image data to image display/recording equipment 109. The interface may be connected to the image display/recording equipment 109 via an Ethernet network 111. The display and recording equipment 109 may comprise display features such as decoders, video data stream recording devices, display computers and any other equipment that is capable of receiving and processing industry standard high-definition IP video streams. The surface controller 101 may include a connector 154, for connection of the interface 130 to the Ethernet network 111. In one embodiment, the interface 130 may comprise an Ethernet switch (e.g. an integrated multi-port 10/100 Mb Ethernet switch). An output from the (e.g. OFDM) modem 129 may comprise a 4-wire bi-directional Ethernet physical layer (PHY) 10/100 Mb link that connects to the integrated multi-port 10/100 Mb Ethernet switch.

The modem 129 is operable to receive image data multiplexed with control and/or monitoring signals via the connector 152. As described above, these image data multiplexed with control and/or monitoring signals may be transmitted to the surface controller 101 by the underwater camera unit 100 via the underwater cable 102. The modem 129 is also operable to de-multiplex the image data and the control and/or monitoring signals. The modem 129 is connected to the processor 131 and the interface 130. The modem 129 is further operable to pass the de-multiplexed image data to the interface 130 and to pass the de-multiplexed control and/or monitoring signals to the processor 131.

The modem 129 is also operable to receive the control and/or monitoring signals generated by the processor 131 and to pass them to the connector 152 for transmission to the underwater camera unit 100 via the underwater cable 102. In this way, the surface controller 101 can be used remotely to operate the underwater camera unit 100.

As with the modem 118 of the underwater camera unit 100, the modem 129 may be an orthogonal frequency division multiplexing (OFDM) modem, operable to decode the encoded the image data signals and the control and/or monitoring signals, received from the modem 118 of each underwater camera unit 100, again using wavelet orthogonal frequency division multiplexing (OFDM) techniques. In one embodiment, the modem 129 is an OFDM modem that uses decoding techniques to receive incoming camera data that exists as a number of sub-carriers (up to 432) each with an analogue bandwidth range of up to 28 MHz. The modem 129 may also use the error correction and/or encryption techniques described above in respect of the modem 118 of the underwater camera unit 100. As with the modem 118 of the underwater camera unit 100, the modem 188 may support full-duplex communications in both directions simultaneously allowing encoded high-definition camera data to be received from the underwater camera unit 100 via the underwater cable 102 at the same time as receiving and transmitting control and/or monitoring signals via the same multiplexed link.

The surface controller 101 may further include a power supply circuit 128. The power supply circuit 128 is connected to the connector 152 so that the power supply circuit 128 can convey the previously discussed supply voltage to the underwater camera unit 100 via the underwater cable 102. The power supply circuit may also distribute power to the features of the surface controller 101 itself. As with the power supply circuit 119 in the underwater camera unit 100, the power supply circuit 128 of the surface controller 100 may be tolerant of the multiplexed and superimposed control and/or monitoring signals described herein.

The power supply circuit 128 may be connected to a power supply cable 110 (e.g. via a connector 153). This may allow the power supply circuit 128 to receive electrical power from the host platform 103. The power supply circuit 128 may be operable to convert and condition the input power from the host platform 103 to produce a number of local power supply voltages for use by the surface control unit 101 sub-systems in addition to the supply voltage to be delivered to the underwater camera unit(s) 100 via the underwater cable 102.

The surface controller 101 may also include a user interface 132. The user interface may, for instance, include a display and one or more user input devices. The user interface 132 may allow the surface controller to be operated by a user, for remotely controlling the underwater camera unit 100 as described herein.

The surface controller 101 may further include an insulation monitoring circuit 133. The insulation monitoring circuit 133 may be used to monitor any electrical insulation of the underwater equipment (e.g. the underwater cable 102 and any attached underwater camera units 100). The insulation monitoring circuit 133 may, upon detection of a breakdown in the electrical insulation, provide the user with an alarm.

As described herein, and in accordance with embodiments of this invention, the modem 118 and the modem 129 may each be an OFDM modem that relies upon a data transmission method that multiplexes the image data and the control and/or monitoring signals and superimposes them over a (e.g. DC) supply voltage provided to the underwater camera unit 100 via the underwater cable 102. This can allow power to be transmitted from the surface controller 101 to one or more underwater camera units 100 as described herein.

The underwater cable 102 used for a particular implementation may be provided with sufficient cross-sectional conductor area to afford a voltage drop based on an operating current of the underwater camera unit(s) 100 that provides a minimum required direct current (DC) voltage at each connected underwater camera unit 100 (e.g. 22 volts). The specification of the underwater cable 102 may be defined based on a surface power voltage transmitted from the surface controller 100 (28V DC), the number of underwater camera units 100 to be operated, and a maximum length of the underwater cable 102.

As the system described herein may support more than two devices (e.g. one surface controller 101 and one or more underwater camera units 100), the modem topology may be thought of as a bus, rather than as a point-to-point network where each device (surface controller 101 and one or more underwater camera units 100) is defined as an addressable node on the bus.

In accordance with embodiments of this invention, the surface controller 100 may act as a master node, with the responsibility to manage the multiplexing methods employed by the surface controller 101 (e.g. the modem 129 to be described below) and the 'slave' units of the system (e.g. the modem(s) of the one or more underwater camera units 100).

As is known in the art of communications, orthogonal frequency-division multiplexing (OFDM) is a method that encodes digital data on multiple carrier frequencies. An advantage of OFDM multiplexing is its use of a (potentially large) number of closely spaced overlapping frequency-centred orthogonal subcarriers onto which digital payload data symbols are modulated. Through the use of Fast Fourier Transform techniques for modulation and de-modulation of these multiple subcarriers the interference between adjacent subcarriers may be minimised, which may be further enhanced through the use of convoluted forward error correction techniques to reduce errors from interference, multi-path transmission and reflections.

In accordance with embodiments of this invention, each OFDM subcarrier may be modulated using a quadrature amplitude modulation (QAM) technique where the maximum constellation size is, for example 12-bit (i.e. 4096 levels) and in which the data may be split into multiple subcarriers operating at numerous centre-frequencies. To further improve data transmission performance, the use of an error correction scheme may be implemented rather than simple rejection of detected errors. This scheme may use a quasi-cyclic low density party check method of forward error correction and the overall result yields the capability for reliable high data rate communications over cables that would be otherwise unsuitable for high speed data transmission through less sophisticated techniques.

In accordance with embodiments of this invention, the multiplexing may rely upon a windowed or shaped OFDM method. This may provide better performance than conventional OFDM techniques by reducing inter-carrier and inter-symbol interference whilst offering improved spectral efficiency.

The OFDM modems described herein, under the control of the master node (the surface controller 101) may use an adaptive method to determine the transmission media capabilities (i.e. the cable characteristics when operated at the chosen frequencies) and thus instigate quasi-real-time communication links with optimal subcarrier spacing and number. This adaptive technique may allow best use of varying data rates, multiple and differing numbers of connected camera nodes and the vagaries in cable parameters. The technique used may define frequency bands for a number of carriers (e.g. up to 432 subcarriers), each of which may have an adaptive channel bandwidth (e.g. between 2 MHz and 28 MHz). Data transmission between nodes may be controlled and scheduled by the master node. A token-passing scheme may be implemented to assure the avoidance of data collisions on the various defined OFDM 'channels'.

In addition to providing data integrity through forward error-correction methods, additional security may be provided through the use of data encryption within the system's modems that implements an Advanced Encryption Standard (AES) algorithm (e.g. having a 128-bit key length).

The individual data rate requirement of each connected underwater camera 100 may typically be dependent on the video stream parameters that are configured for the image processor 126. This may typically range between 1 Mbit/second for lower image resolutions and frame-rates with high data compression in the video stream up to 100 Mbit/second for low-latency less compressed higher frame rates at higher image resolutions. The optimum data rates may be profiled and selected for the system either manually or automatically to provide the best performance for a particular configuration (i.e. according to the number of underwater camera units 100, the length of the underwater cable 102, and video image requirements). For a typical system, a theoretical maximum data rate for the OFDM link between underwater camera unit(s) 100 and the surface controller 101 over an underwater cable 102 that comprises two wires may be an aggregated 230 Mbit/second, but limitations of a 100 Mbit/second network connection between the OFDM modems and external network devices may limit the overall usable system bandwidth, which in turn may limit the practical number of underwater camera units 100 that a particular system can support simultaneously. Future enhancements in OFDM modem technology that are based on the same principles, and or the implementation of systems with higher network physical interface links (PHY) of up to 1 Gbit/second may extend the system bandwidth and therefore its capabilities.

Accordingly, there has been described an underwater camera unit. The camera unit includes a pressure housing containing a modem, a command processor coupled to the modem to receive control signals from the modem, an image processor coupled to the modem to provide image data to the modem, and a camera sensor coupled to the image processor. The camera unit also includes a connector for connecting the underwater camera unit to the underwater cable. The modem is coupled to the connector. The modem is operable to multiplex image data from the image processor with control and/or monitoring signals from the command processor and transmit the multiplexed image data and control and/or monitoring signals from the underwater camera unit via the connector. The modem is also operable to receive control and/or monitoring signals via the connector and pass them to the command processor. A surface controller has also been described for controlling an underwater camera unit via an underwater cable. The surface controller comprises a connector for connecting the surface controller to the underwater cable, a modem coupled to the connector, and a processor operable to generate and process control and/or monitoring signals. The processor is coupled to the modem. The surface controller also comprises an interface for passing image data to image display/recording equipment. The interface is coupled to the modem. The modem is operable to receive image data multiplexed with control and/or monitoring signals via the connector, de-multiplex the image data and the control and/or monitoring signals, pass the de-multiplexed image data to the interface, receive control and/or monitoring signals generated by the processor and pass them to the modem for transmission to the underwater camera unit via the underwater cable.

Although particular embodiments of this disclosure have been described, it will be appreciated that many modifications/additions and/or substitutions may be made within the scope of the claims.

The invention claimed is:

1. An underwater camera unit comprising:
   a pressure housing containing:
      a modem;
      a command processor coupled to the modem, and configured to receive control and/or monitoring signals from the modem;
      an image processor coupled to the modem, and configured to provide image data to the modem;
      a camera sensor coupled to the image processor; and
      a power supply circuit; and
   a connector coupled to the modem and further coupled to the power supply circuit, and configured to connect the underwater camera unit to an underwater cable comprising two wires, to receive control and/or monitoring signals and a DC supply voltage via the underwater cable and to transmit multiplexed image data and control and/or monitoring signals via the underwater cable,
   wherein the power supply circuit is configured to receive the DC supply voltage from the underwater cable via the connector,
   wherein the modem is configured to:
      multiplex image data from the image processor with control and/or monitoring signals from the command processor and transmit the multiplexed image data and control and/or monitoring signals from the underwater camera unit via the connector; and
      receive control and/or monitoring signals via the connector and pass them to the command processor, and
   wherein the image data and the control and/or monitoring signals are superimposed on the DC supply voltage on the underwater cable.

2. The underwater camera unit of claim 1, wherein the pressure housing also contains a first light source, wherein the control and/or monitoring signals are for controlling and/or monitoring the operation of the light source.

3. The underwater camera unit of claim 2, wherein the pressure housing contains a further light source for use when there is a malfunction in the operation of the first light source.

4. The underwater camera unit of claim 3, comprising a driver circuit for driving the further light source, wherein the driver circuit is operable to switch on the further light source in response to a loss of said DC supply voltage to the power supply circuit.

5. The underwater camera unit of claim 4, further comprising a magnet attachable to the underwater camera unit, wherein the driver circuit for driving the further light source is operable to detect the presence of magnetic flux associated with said magnet and to not switch on the further light source when said magnetic flux is detected, irrespective of whether said DC supply voltage to the power supply circuit is present.

6. The underwater camera unit of claim 1, wherein the underwater camera unit further includes at least one sensor, and wherein the control and/or monitoring signals are for controlling and/or monitoring the operation of the at least one sensor.

7. The underwater camera unit of claim 6, wherein the at least one sensor is a pressure sensor for determining a depth of the underwater camera unit beneath the surface of water in which the underwater camera unit is submerged.

8. The underwater camera unit of claim 1, wherein the underwater camera unit comprises a further connector, for connecting the underwater camera unit to a further device located externally with respect to the pressure housing, wherein the modem is coupled to the further connector, and wherein the control and/or monitoring signals are for controlling and/or monitoring the operation of the further device.

9. The underwater camera unit of claim 8, wherein the further device comprises a pressure sensor for determining a remaining air supply in a diver's air tank.

10. The underwater camera unit of claim 1, wherein the modem is an orthogonal frequency-division multiplexing (OFDM) modem.

11. The underwater camera unit of claim 1 further comprising two wires, wherein the underwater cable is connected to the connector of the underwater camera unit.

12. The underwater camera unit and underwater cable of claim 11, wherein the underwater cable comprises two wires.

13. A surface controller for controlling an underwater camera unit via an underwater cable comprising two wires, the surface controller comprising:
    a power supply circuit configured to supply a DC supply voltage;
    a connector coupled to the power supply circuit, configured to connect the surface controller to the underwater cable to couple the surface controller to the underwater camera unit, to transmit control and/or monitoring signals and supply the DC supply voltage via the underwater cable and to receive image data multiplexed with control and/or monitoring signals via the underwater cable;
    a modem coupled to the connector;
    a processor configured to generate and process control and/or monitoring signals, wherein the processor is coupled to the modem; and
    an interface configured to pass image data to image display/recording equipment, wherein the interface is coupled to the modem,
    wherein the modem is configured to:
        receive the image data multiplexed with control and/or monitoring signals via the connector,
        de-multiplex the image data and the control and/or monitoring signals;
        pass the de-multiplexed image data to the interface;
        pass the de-multiplexed control and/or monitoring signals to the processor; and
        receive the control and/or monitoring signals generated by the processor and pass them to the connector for transmission to the underwater camera unit via the underwater cable, and
    wherein the image data and the control and/or monitoring signals are superimposed on the DC supply voltage on the underwater cable.

14. The surface controller of claim 13, wherein the control and/or monitoring signals generated by the processor are for controlling and/or monitoring the operation of a light source in the underwater camera unit.

15. The surface controller of claim 13 comprising a user interface including a display and one or more user input devices.

16. The surface controller of claim 13, wherein the modem is an orthogonal frequency-division multiplexing (OFDM) modem.

17. The surface controller of claim 13 further comprising two wires, wherein the underwater cable is connected to the connector of the surface controller.

18. The surface controller according to claim 13 wherein the underwater camera unit comprises:
    a pressure housing containing:
        a modem;
        a command processor coupled to the modem to receive control and/or monitoring signals from the modem;
        an image processor coupled to the modem to provide image data to the modem;
        a camera sensor coupled to the image processor; and
        a connector for connecting the underwater camera unit to the underwater cable comprising two wires, to receive the control and/or monitoring signals and the DC supply voltage via the underwater cable comprising two wires and to transmit the multiplexed image data and the control and/or monitoring signals via the underwater cable comprising two wires,
    wherein the modem is coupled to the connector, and
    wherein the modem is operable to:
        multiplex image data from the image processor with control and/or monitoring signals from the command processor and transmit the multiplexed image data and control and/or monitoring signals from the underwater camera unit via the connector; and
        receive control and/or monitoring signals via the connector and pass them to the command processor, and
    wherein the pressure housing also contains a power supply circuit coupled to the connector for receiving the DC supply voltage from the underwater cable comprising two wires via said connector.

19. The system of claim 18, wherein the underwater camera unit is coupled to the surface controller via the underwater cable.

20. The system of claim 19, comprising at least one further said underwater camera unit coupled to the surface controller via the underwater cable.

21. A method of operating an underwater camera unit, the underwater camera unit comprising:
    a pressure housing containing:
        a modem;
        a command processor coupled to the modem to receive control signals from the modem;
        an image processor coupled to the modem to provide image data to the modem;
        a camera sensor coupled to the image processor; and
        a power supply circuit; and
    a connector for connecting the underwater camera unit to an underwater cable comprising two wires, to receive control and/or monitoring signals and a DC supply voltage via the underwater cable and to transmit multiplexed image data and control and/or monitoring signals via the underwater cable comprising two wires,
    wherein the modem is coupled to the connector,
    wherein the method comprises:
        multiplexing image data from the image processor with control and/or monitoring signals from the command processor and transmitting the multiplexed image data and control and/or monitoring signals from the underwater camera unit via the connector by the modem; and
        receiving control and/or monitoring signals via the connector and passing them to the command processor by the modem; and receiving the DC supply voltage from the underwater cable via said connector by the power supply circuit, and wherein the image data and the control and/or monitoring signals are superimposed on the DC supply voltage on the underwater cable.

22. A method of operating a surface controller for controlling an underwater camera unit via an underwater cable comprising two wires, the surface controller comprising:
a power supply circuit;
a connector coupled to the power supply circuit, configured to connect the surface controller to the underwater cable to couple the surface controller to the underwater camera unit, to transmit control and/or monitoring signals and supply a DC supply voltage via the underwater cable and to receive image data multiplexed with control and/or monitoring signals via the underwater cable;
a modem coupled to the connector;
a processor configured to generate and process control and/or monitoring signals, wherein the processor is coupled to the modem; and
an interface configured to pass image data to image display/recording equipment, wherein the interface is coupled to the modem, the method comprising:
receiving image data multiplexed with control and/or monitoring signals via the connector by the modem;
de-multiplexing the image data and the control and/or monitoring signals by the modem;
passing the de-multiplexed image data to the interface by the modem;
passing the de-multiplexed control and/or monitoring signals to the processor by the modem;
receiving control and/or monitoring signals generated by the processor; and
passing the control and/or monitoring signals to the connector for transmission to the underwater camera unit via the underwater cable; and
supplying the DC supply voltage to the underwater cable by the power supply circuit via said connector,
wherein the image data and the control and/or monitoring signals are superimposed on the DC supply voltage on the underwater cable.

\* \* \* \* \*